(12) United States Patent
Gelbard et al.

(10) Patent No.: US 8,751,808 B2
(45) Date of Patent: Jun. 10, 2014

(54) METHOD AND SYSTEM FOR SHARING TRUSTED CONTACT INFORMATION

(76) Inventors: Roy Gelbard, Tel Aviv (IL); Ran M. Bittmann, Tel Aviv (IL)

(*) Notice: Subject to any disclaimer, the term of this patent is extended or adjusted under 35 U.S.C. 154(b) by 170 days.

(21) Appl. No.: 12/943,982

(22) Filed: Nov. 11, 2010

(65) Prior Publication Data

US 2011/0113249 A1 May 12, 2011

Related U.S. Application Data

(60) Provisional application No. 61/260,694, filed on Nov. 12, 2009.

(51) Int. Cl.
*H04L 29/06* (2006.01)
*H04L 12/58* (2006.01)

(52) U.S. Cl.
CPC .................. *H04L 12/585* (2013.01)
USPC ........................................ 713/170

(58) Field of Classification Search
CPC .................................... H04L 12/585
USPC ........................................ 713/170
See application file for complete search history.

(56) References Cited

U.S. PATENT DOCUMENTS

| | | | |
|---|---|---|---|
| 6,732,157 B1 | 5/2004 | Gordon | |
| 7,366,761 B2 | 4/2008 | Murray et al. | |
| 7,461,263 B2 | 12/2008 | Prince | |
| 7,673,003 B2 | 3/2010 | Little, II | |
| 2004/0111480 A1* | 6/2004 | Yue | 709/206 |
| 2004/0148506 A1 | 7/2004 | Prince | |
| 2004/0177120 A1 | 9/2004 | Kirsch et al. | |
| 2005/0005164 A1* | 1/2005 | Syiek et al. | 713/201 |
| 2005/0080855 A1 | 4/2005 | Murray et al. | |
| 2005/0080856 A1 | 4/2005 | Kirsch et al. | |
| 2005/0080857 A1 | 4/2005 | Kirsch et al. | |
| 2005/0091319 A1 | 4/2005 | Kirsch et al. | |
| 2005/0091320 A1 | 4/2005 | Kirsch et al. | |
| 2009/0031129 A1 | 1/2009 | Milliken | |
| 2009/0132670 A1 | 5/2009 | Syiek | |

* cited by examiner

*Primary Examiner* — Hadi Armouche
*Assistant Examiner* — Dao Ho
(74) *Attorney, Agent, or Firm* — Browdy and Neimark, PLLC (57) ABSTRACT

A method and system for sharing trusted contact information between trusted, known and unknown parties, without revealing the contact information itself, thus protecting the party defined in the contact from possible unsolicited messages known as "Spam". Addresses of trusted senders are encrypted using a one-way encryption and stored in a whitelist repository that can be shared by different users. When a message is received, its senders address is extracted, encrypted using the same encryption method, and compared if it is found in the whitelist repository.

20 Claims, 6 Drawing Sheets

METHOD AND SYSTEM FOR SHARING TRUSTED CONTACT INFORMATION

CROSS REFERENCE TO OTHER APPLICATIONS

This application claims priority from U.S. Provisional Patent Application No. 61/260,694 filed on Nov. 12, 2009 and incorporate herein by reference.

TECHNICAL FIELD

The invention relates to a method and system for sharing trusted information in general and in particular to sharing contact information without revealing the origin addresses (origin), the owners and the contents of the shared information.

BACKGROUND ART

Unsolicited messages referred here as "Spam", is a problem effecting mainly electronic mail communication, but also other type of communication such as: phone, fax, Short Message Service (SMS) messages, instant messages such as Windows Messenger™, ICQ™, Skype™ and similar.

There are multiple ways trying to fight this phenomenon, most of the methods are based on scoring systems that try to identify: unsolicited message patterns, masqueraded origin address, sources (e.g. mail servers) located in lists known as "Blacklists" originating Spam messages, and prevent such messages from reaching the user.

The user receives his or her messages using user clients such as mail clients (e.g. Microsoft Outlook™), messaging servers (e.g. Microsoft Exchange™) and web mail systems (e.g. Gmail™, Yahoo Mail™ and Hotmail™). Each of these systems receives the messages and has filtering capabilities to deny a message or forward it to a known "Spam" or "Junk" or "Bulk" folder for future examination. None of the existing systems is 100% fail proof and suffers to a certain degree of false positive "Spam" identification, i.e. treating important messages as "Spam", or false negative "Spam" identification, i.e. letting "Spam" messages through as if they were relevant messages.

Another method for ensuring that only relevant messages are received is to use a classifier, noted hereby as "Whitelist", i.e. a classifier (filter) that contains message origin addresses and allowing only messages from trusted parties (origin addresses) to reach the user. Therefore "Whitelist" is a dynamic-temporal set of records with credibility value bigger then a threshold (scoring value that can dynamically change). The credibility-scoring is calculated based on diverse parameters including but not limited to tags assigned by the system, tags assigned by the user, frequency of mal-messages, decline rate of mal-messages, distance between social networks, collaborative rating, etc.

Variation on this concept are used by some existing "Spam" filters such as CA's Anti-Spam™ (formerly Qurb™) system. While this method is efficient in forwarding only messages from trusted origins, the source for these origins is limited and comes usually only from addresses inserted by the user, either in his or her address book or from messages he or she sent.

Internet communication allows for the forming of social networks of people who know each other or share a common interest. One outcome of such social networks is sharing and aggregating information between the members in those social networks. Examples for social networks are Wikipedia™ as an encyclopedia shared by its members, LinkedIn™ as a contacts network, Flickr™ as a photo exchange network and Facebook™ as a general social network with multiple shared topics. Another place where people tend to share information is there workplace or organization. A problem is that people in those networks tend not to expose their contact information to their peers because they do not want to reveal this information to people who may exploit the contact information to send "Spam" to those contacts or even because they treat their contact information as trade secrets.

Cryptography provides us with many tools to hide information from unwanted parties. One of the interesting cryptographic methods is Hashing. Hashing is a method that receives a certain plaintext as input and encrypts it producing a digest. Using an efficient hashing method it is virtually impossible to decrypt the digest to produce the source plaintext. However using the same Hashing method on the same plaintext will always produce the same digest. This is why the Hashing method is sometimes called "one way encryption". Examples for such Hashing methods are SHA-1 and MD5. Hashing methods are commonly used for digital signatures and password verification.

SUMMARY OF INVENTION

It is an object of the present invention to enable two or more parties to share contact information.

It is another object of the present invention to enable two or more parties to share contact information while not revealing to the other party the origin addresses (origin), the owners and the contents of the contact information.

The invention is directed to a method and system for sharing trusted origin addresses. More specifically the invention is directed to hashing encryption of origin addresses constructing lists (whitelists) of classified origins to be shared between parties in networking domains, in several levels of association, approved by messaging software without revealing the origin address itself and exposing it to mal-messages i.e. "Spam".

The present invention thus relates to a method for approving a received message as coming from a trusted sender, the method comprising the steps of:

(i) receiving a message to be approved and extracting from the message its sender's address;

(ii) encrypting the sender's address according to a predetermined one-way encryption method producing an encrypted sender's address, wherein the one-way encryption method can produce an encrypted address from a non-encrypted address but the non-encrypted address cannot be determined based on the encrypted address; and (iii) verifying if the encrypted sender's address is present in a whitelist repository containing encrypted addresses of trusted sender addresses encrypted by the predetermined one-way encryption method and approving a received message as coming from a trusted sender only if said encrypted sender's address is present in said whitelist repository.

In some embodiments, the one-way encryption method is a hashing function.

In some embodiments, the received messages is an e-mail message, instant message, fax message, Short Message Service (SMS) message, telephone call, Voice over IP (VoIP) call or any combination thereof.

In some embodiments, the trusted sender addresses and whitelist repositories are managed at a separate devices, computers or locations.

In some embodiments, the whitelist repository aggregates whitelists provided by a plurality of users, each whitelist containing encrypted addresses of trusted senders. Thus many whitelists provided by many users can be grouped together to form a whitelist repository. A whitelist repository does not have to physically reside in a single location (server, computer), but can be a logical group of distinct, interconnected whitelists, wherein the whitelists themselves can be located in different locations, computers or servers. The interconnection between the different whitelists is done via known computerized network methods of the art, for example, local networks, Internet, private networks etc.

In some embodiments, the plurality of users share encrypted addresses of trusted senders via peer to peer networks.

In some embodiments, the plurality of users are members of the same social network.

In some embodiments, the plurality of users use the same web-based email program.

In some embodiments, an encrypted sender address or a whitelist or both comprise one or more tags.

In some embodiments, the tag is a note-mark representing content and/or association of the message.

In some embodiments, the one or more tags represent the credibility of an encrypted sender address. For example, a tag can be a score representing a level or a value specifying the credibility of the encrypted sender address. The unencrypted sender is not known. Thus a Digest is tagged but it is not known who the user/person behind that encrypted address (Digest) is.

In some embodiments, the one or more tags represent the credibility of a known provider of a whitelist. For example, a tag can be a value specifying the credibility of a whitelist or even of a Digest. In this scenario, it is known who the owner (provider) of the whitelist that is being tagged is. Similarly, the whitelist repository can also include tags.

In some embodiments, the received messages are classified based on tags and scoring functions of encrypted sender address or whitelist or both.

In some embodiments, scoring functions are calculated based on tags, as well as on frequency of proper/mal messages, declining rate of mal-messages, "social distance" between the sender and the receiver, collaborative rating, etc.

The present invention further relates to a system for approving a received message as coming from a trusted sender, the system comprising:

(i) a message handler that (a) receives a message to be approved, (b) extracts from the message its sender's address, (c) encrypts said sender's address according to a predetermined one-way encryption method producing an encrypted sender's address, wherein the one-way encryption method can produce an encrypted address from a non-encrypted address but the non-encrypted address cannot be determined based on the encrypted address, and (d) sends the encrypted sender's address to a verification server;

(ii) a verification server that verifies if said encrypted sender's address is present in a whitelist repository containing addresses of trusted sender addresses encrypted by said predetermined one-way encryption method, and approves a received message as coming from a trusted sender only if said encrypted sender's address is present in said whitelist repository.

In some embodiments, the system further comprises a whitelist repository.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

In the invention description below the following notations are used:

digest—The output from a hash function. It does not compromise the security (i.e. content) of the input plaintext, but the same hash function when processing the same plaintext will always produce the same digest.

hash function—A function that encrypts plaintext in a manner that cannot be feasibly decrypted. Hashing functions are readily known in the art and include, but are not limited to the following functions: SHA-0, SHA-1, SHA-256, SHA-384, SHA-512, MD2, MD4, MD5, RIPEMD-160, RIPEMD-128/256/320, HAS160, HAS-V, HAVAL, Tiger, Panama, Snefru-2, GOST-Hash, BRS-H1/H20, and Whirpool. The input to a hash function is plaintext and the output is a digest. A hash function will always produce the same digest from the same plaintext.

origin—A sender address. The address of the originator of the message. It is assumed that this address is verified as the true address via procedures readily known in the art. In a preferred embodiment of the invention the messages are e-mail messages, but the invention is not limited to this type of messages and can be applied by someone familiar with the art, to other type of messages vulnerable to Spam such as: phone calls, fax messages, instant messaging messages, Short Message Service (SMS) messages and similar.

plaintext—the unencrypted input to a hash function, typically text comprising any combination of letters, numbers and symbols.

Spam—Unsolicited messages, i.e. messages that the user did not request to receive and does not want to receive, usually causing the user to spend unnecessary resources and distracting the user from information he or she are interested to attend.

tag—A descriptor associated with one or more origin addresses in one or more whitelists, or associated with one or more whitelists. As it is known in the art, tags are also suitable to produce a hierarchical structure of origin addresses. A tag may include the provider (owner) of the whitelist or digest, the certificate of the whitelist or digest, a category of the whitelist or digest, a project or company associated with a whitelist or digest or similar.

user—Person or any other entity capable of receiving messages.

whitelist—A temporal set (list) of addresses that messages originating from these addresses can be trusted. A whitelist may contain additional information describing it or its addresses, this information may include, but is not limited to: provider (owner) of the whitelist, category of the whitelist, credibility of the origin, tags, etc.

In some embodiments, the whitelist is a temporal set of revised sender addresses, which members can change according to review-scoring method defined by the user and the system.

The invention describes a method and system for sharing contact information between two parties without exposing the contact information itself so that a user receiving a message, e.g. an e-mail message may verify that the message is from an origin which appears in his or her trusted origins whitelist. This whitelist is constructed from origins, such as, but not limited to, e-mail addresses, that the user knows and trusts and origins recommended to him by peers in social networks, friends and colleagues (commonly referred to as "peers" in this document).

Figure 1:
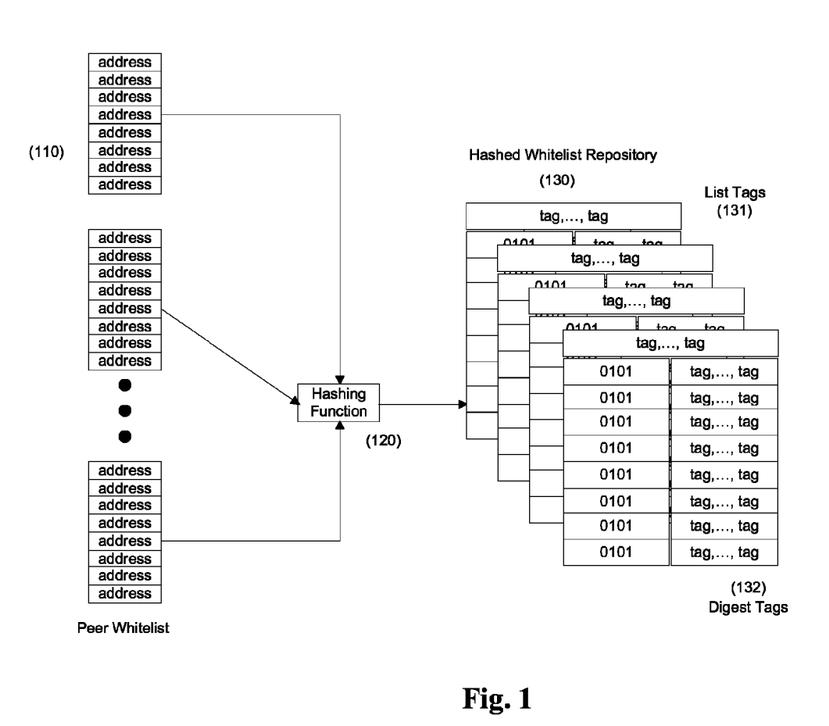
FIG. 1 is a block diagram illustrating the creation of a whitelist repository.

FIG. 1 shows the procedure of creating whitelists. Plaintext origins (trusted senders) are gathered in a Peer whitelist 110, representing origin addresses (trusted senders) known to peers that they would like to share with others as trusted origins, without compromising the plaintext origin and exposing it to Spam or comprising the origin address privacy. A one-way encryption method 120 such as a Hashing Function is performed on those plaintext origin addresses producing a whitelist of digests (encrypted addresses) in a Hashed Whitelist Repository 130. Using A one-way encryption method 120 ensures that someone who has access to an encrypted address cannot determine (or easily determine) the corresponding non-encrypted address.

Tags may be added to categorize both the digests with Digest Tags, and the whitelists with List Tags 131. More than one tag 131, 132 may be associated with each entity, digest or whitelist in the Hashed Whitelist Repository 130.

A Digest Tag 132 can, for example, be a score of the sender's address, such as how much Spam is sent via this origin address.

List Tags 131 can, for example, be the score of the owner of the encrypted whitelist or whitelist repository 130, such as how credible are the origins recommended by the owner of the whitelist repository 130.

Tags 131, 132 may be either added by the user/owner of an origin address or a whitelist repository 130. Alternatively, the tag (score) can be attributed by the system based on a variety of parameters such as user feedback or information retrieved from other sources (rating databases etc.). For example, if many users complain that lot of Spam messages are being sent from an address, the system might downgrade the rating of that address.

List Tags 131 are associated with the known owner of a whitelist or whitelist repository 130. For example, John trusts his friend Jack and all the addresses supplied by Jack, thus John will accept all the whitelists that are tagged as coming from Jack.

Digest Tags 132 on the other hand refer to an unknown origin address. For example, a certain address in Jack's whitelist repositories 130 might be used for sending messages which annoy certain receivers who then rate that address negatively and which leads to the system to downgrade the credibility score of that specific Digest. In this case, John does not know who is the person behind that Digest with a low credibility grade, but he can make a decision whether to accept or reject messages coming from that unknown address.

Figure 2:
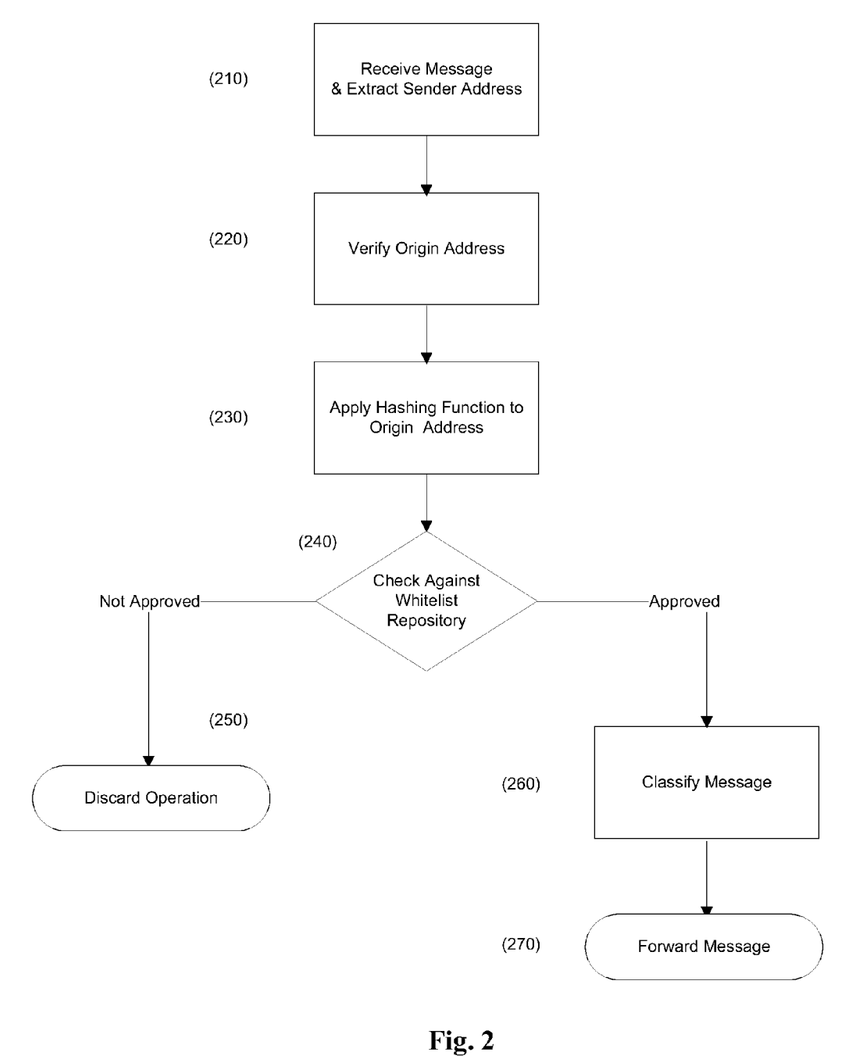
FIG. 2 is a flowchart illustrating the process of message approval.

FIG. 2 shows a flowchart illustrating the process of message approval. In step 210 a message to be approved is received and the sender's address is extracted. The sender's address can be verified by means readily available in the art in optional step 220. In step 230 a hashing function (or any other one-way encryption method) is applied to the sender's address (origin). In step 240 the resulting encrypted sender's address (digest) is verified to be present in a whitelist repository containing encrypted addresses of trusted sender addresses encrypted by the same one-way encryption method used to encrypt the sender's address.

A received message is approved as coming from a trusted sender only if the encrypted sender's address (digest) is present in the whitelist repository 130. After the message is approved, it can be optionally checked for tags 132 associated with all the appearances of the origin in all the whitelists, including the tags 131 associated with the whitelists themselves. In step 260 the classification operation is performed according to the message category based on the tags associated with its origin. The classification operation 260 may include adding the tags to the subject line, or any other operation the user chooses to do.

If the digest does not match one of the digests in the whitelist repository it is not approved and in step 250 a discard operation is performed. The discard operation will depend on the implementation requirements. For example, deleting the message, forwarding the message to a Spam folder so the user can review and decide what to do, classify the message as "unapproved sender", auto-reply to the sender to verify its existence, or any other activity defined by the user or the application.

Finally, the approved message whether classified or unclassified is forwarded to the user client software (messaging server or messaging client) for continued processing as any normal received message in step 270.

FIGS. 3-6 illustrate exemplary embodiments of the invention.

Figure 3:
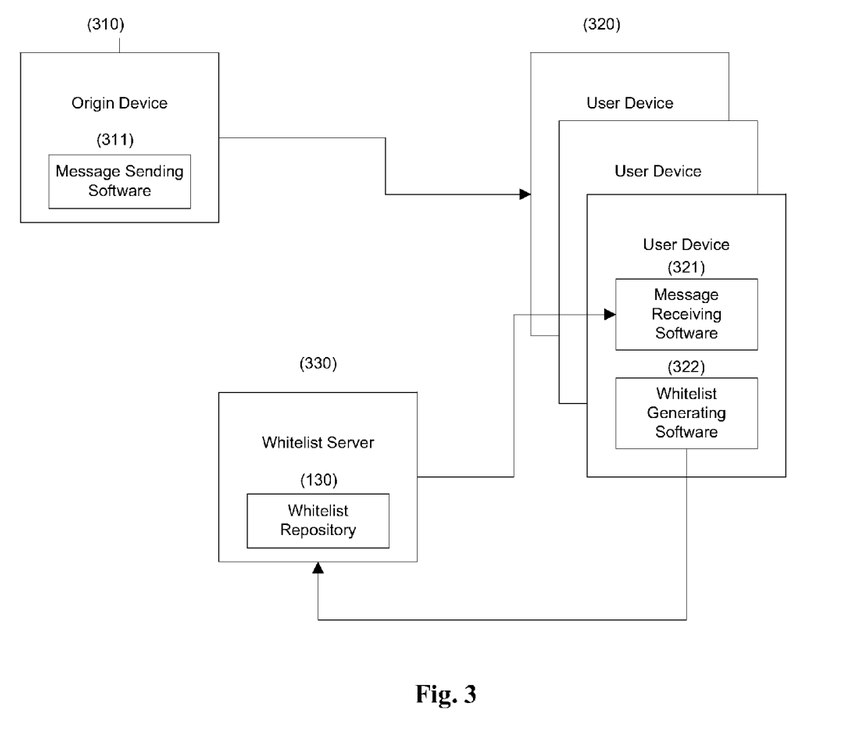
FIG. 3 is a block diagram illustrating an embodiment of approving a message based on local whitelist repositories.

FIG. 3 is a block diagram illustrating an embodiment of approving a message based on local whitelist repositories. In this embodiment an Origin Device 310 running a Message Sending Software 311 (such as an email client, an instant messaging program, a chat program etc.) sends a message to a User Device 320. The User Device 320 may run a Whitelist Generating Software 322 (running a one-way encryption method 120), where the user can generate a whitelist repository 130 of origin addresses he trusts and wishes to share with his or her peers. To share the whitelist repository 130 without compromising the origin sender address (not encrypted), the Whitelist Generating Software 322 hashes (applies a one-way encryption function 120) the origin address producing a digest. Optionally, digest tags 132 and/or list tags 131 are added to the digests or whitelist categorizing the whitelists and digests. The hashed whitelist is sent to a Whitelist Server 330 where it is kept in a Whitelist Repository 130. The User Device 320 may contain a Message Receiving Software 321 that receives by itself, or by means of plug-ins, add-ons, filters or external software, an updated copy of all the whitelist repositories 130 the user registered to in the Whitelist Server 330 and compares the digest of the received message to the locally received whitelist repositories 130 as illustrated in FIG. 2 and discussed above. It should be noted that there is no need for the Whitelist Generating Software 322 and the Message Receiving Software 321 to be located on the same User Device 320 and as it is well known to anyone familiar with the art that a user may have multiple devices, some generating whitelist repositories 130 and some receiving messages.

Figure 4:
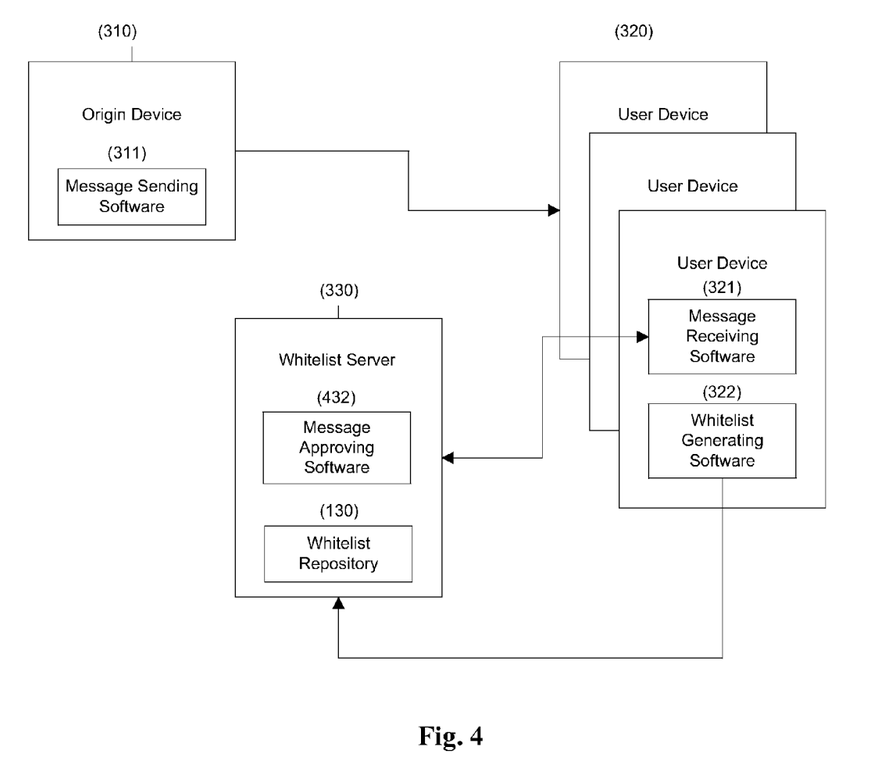
FIG. 4 is a block diagram illustrating an embodiment of approving a message based on remote whitelist repositories.

FIG. 4 is a block diagram illustrating an embodiment of approving a message based on remote whitelist repositories 130. In this embodiment an Origin Device 310 running a Message Sending Software 311 sends a message to the User Device 320. The User Device 320 may run a Whitelist Generating Software 322 where the user can generate a whitelist repository 130 of origin addresses he or she trusts and wishes to share with his or her peers. To share the whitelist repository 130 without compromising the origin address, the Whitelist Generating Software 322 hashes the origin address (applies a one-way encryption function 120) producing a digest, and adds to the whitelist, or to each of the digests' tags categorizing the whitelists, as described in FIG. 1. The hashed whitelist is sent to a Whitelist Server 330 where it is kept in a Whitelist Repository 130. The User Device 320 may contain a Message Receiving Software 321 that sends the digest of the origin of a received message, by itself, or by means of plug-ins, add-ons, filters or external software, to the Whitelist Server 330. The Whitelist Server 330 runs a Message Approving Software 432 that compares the digest of the received message to the whitelists as discussed above in relation to FIG. 2. It should be noted that there is no need for the Whitelist Generating Software 322 and the Message Receiving Software 321 to be located on the same User Device 320 and as it is well known to anyone familiar with the art, a user may have multiple devices, some generating whitelist repositories 130 and some receiving messages.

The Message Approving Software 432 may also be certification software, where users publishing whitelist repositories 130 are certified by the Message Approving Software 432 or any other certification program in a process readily known in the art.

Figure 5:
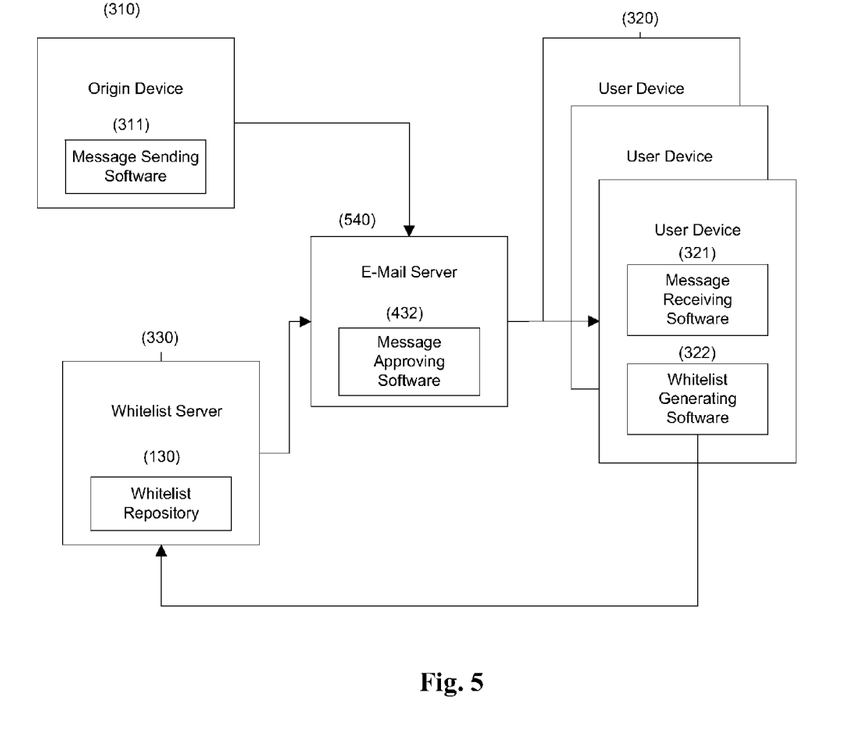
FIG. 5 is a block diagram illustrating an embodiment of approving a message based on remote whitelist repositories.

FIG. 5 is a block diagram illustrating an embodiment of approving a message based on remote whitelist repositories 130. In this embodiment the messages are sent from the Origin Device 310 by the Message Sending Software 311 to an E-Mail Server 540 that receives all the messages and runs the Message Approval Software 432 module. The User Device 320 may run a Whitelist Generating Software 322 where the user can generate a whitelist repository 130 of origin addresses he trusts and wishes to share with his or her peers. To share the whitelist repository 130 without compromising the (non-encrypted) origin address the Whitelist Generating Software 322 hashes the origin address (applies a one-way encryption function 120) producing a digest. Optionally, list tags 131 and digest tags 132 are added to the whitelists and digests. The hashed whitelist is sent to a Whitelist Server 330 where it is kept in a whitelist repository 130. The Message Approving Software 432 receives a whitelist repository 130 a Whitelist Server 330.

Approved messages are then forwarded from the E-Mail Server 540 to the User Device 320 where the Message Receiving Software 321 presents the messages to the user as discussed above in relation to FIG. 2. It should be noted that in some embodiments of the invention the E-Mail Server 540 and the Whitelist Server 330 could be the same entity. In some embodiments of the invention the Message Approving Software 432 could run in the Whitelist Server 330 in a similar manner as discussed above in relation to FIG. 4.

The Message Approving Software 432 may also be certification software, where users publishing whitelist repositories 130 are certified by the Message Approving Software 432 or any other certification program in a process readily known in the art.

Figure 6:
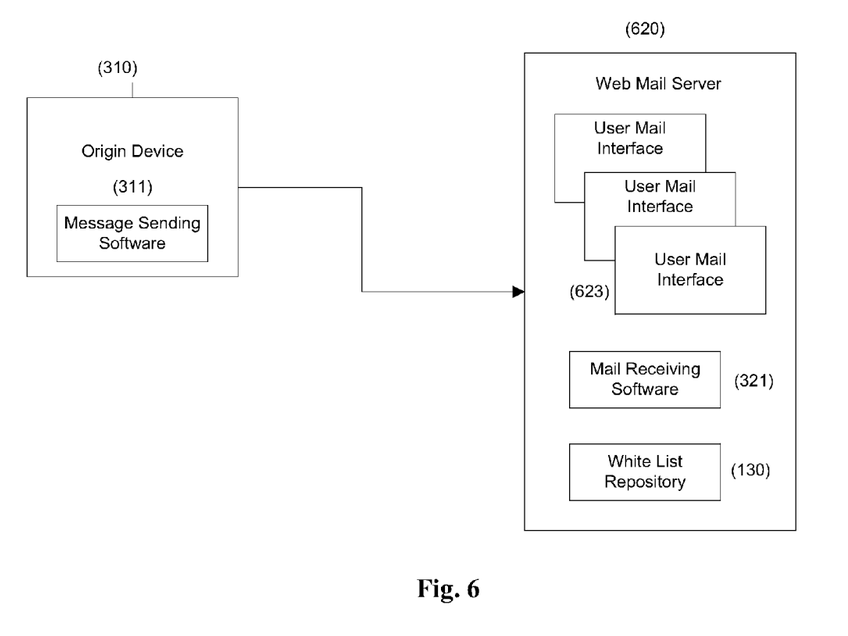
FIG. 6 is a block diagram illustrating an embodiment of approving a message in a Web-mail implementation.

FIG. 6 is a block diagram illustrating an embodiment of approving a message in a Web-mail implementation. In this embodiment an Origin Device 310 running a Message Sending Software 311 sends a message to a Web Mail Server 620. The Web Mail Server 620 contains a whitelist repository 130 where the Web Mail users, through the User Mail Interface 623 save digests of origins they trust and want to share with their peers. The Mail Receiving Software 321 running in the Web Mail Server 620 receives the message and compares its digest to the whitelist repositories 130 according to the process defined above in relation to FIG. 2. Examples for popular web mail servers 620 include but are not limited to Gmail™ by Google Corporation, Hotmail™ by Microsoft Corporation, Yahoo Mail™ by Yahoo Corporation and similar. In some cases the web mail server 620 acts as a mail server only and forwards the mail to mail client software, in this case the activity is similar to the activity described in relation to FIG. 5. As it is well known to anyone familiar with the art, not all the processes described above need to run on the same server and in some cases, the Mail Receiving Software 321 or the Whitelist Repository 130 or both, may be located on different servers.

Example 1

Sales Person Professional Contacts

For many professionals, knowing the right influential people can be very valuable and lucrative. For example, a seasoned sales person in the industry may know many clients and the right contact people at each client. Such a sales person may not want to share all his contacts explicitly with the company he's currently working with. The company may be interested in creating a whitelist with all the company's clients and contacts in them, so that messages from these clients and contacts could be approved. In this scenario, the sales person with the confidential contact list could provide the company a whitelist repository 130 encrypted according to the invention. The company would thus be able to approve messages received from valid contacts and clients while the sales person did not compromise his private information.

Example 2

Publishing Contacts for Authorized Mailings

Companies sending regular messages often advise their recipients to add their contacts to their whitelists or authorized contacts so that their messages will be less likely to be rejected or categorized as Spam messages. The problem is that once a company advertizes these contacts, the contacts (for example email addresses) themselves may receive unsolicited messages. Many companies thus use email accounts that do not accept replies, thus limiting the communication between the company and its clients. For example, companies typically use email addresses such as "noreply@company.com", thus limiting the communication back from their clients.

Using encrypted addresses (digests) according to the invention, the company could advertize its encrypted addresses so that users seeking to receive messages from the company could add these encrypted addresses to their own whitelist repositories 130.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method for enabling two or more parties to share contact information by sharing a whitelist without revealing the content of said whitelist and for permitting a party sharing such a whitelist to identify a received message as coming from a trusted sender, the method comprising the steps of:
   (i) creating a whitelist of encrypted addresses of trusted users that are approved for sending messages using a one-way encryption method producing an encrypted sender's address, wherein the one-way encryption method can produce an encrypted address from a non-encrypted address but the non-encrypted address cannot be determined based on the encrypted address;
   (ii) sharing said whitelist of encrypted addresses of trusted users among two or more parties;
   (iii) when a message to be approved is received by a party sharing said whitelist of encrypted addresses of trusted users, extracting from the message its sender's address;
   (iv) encrypting said sender's address according to the same one-way encryption method used in step (i), thereby producing an encrypted senders address; and
   (v) verifying if said encrypted sender's address is present in said whitelist containing encrypted addresses of trusted sender addresses encrypted by said one-way encryption method and identifying a received message as coming from a trusted sender only if said encrypted sender's address is present in said whitelist of encrypted addresses of trusted users.

2. The method according to claim 1, wherein said one-way encryption method is a hashing function.

3. The method according to claim 1, wherein said received message is an e-mail message, instant message, fax message, Short Message Service (SMS) message, telephone call, Voice over IP (VoIP) call or any combination thereof.

4. The method according to claim 1, wherein a plurality of whitelists are maintained in a whitelist repository, each whitelist containing encrypted addresses of trusted senders.

5. The method according to claim 4, wherein trusted sender addresses and the whitelist repository are managed at separate devices, computers or locations.

6. The method according to claim 4, wherein said plurality of users share encrypted addresses of trusted senders via peer to peer networks.

7. The method according to claim 4, wherein said plurality of users are members of the same social network.

8. The method according to claim 4, wherein said plurality of users use the same web-based email program.

9. The method according to claim 4, wherein at least one of said encrypted addresses or at least one said whitelists or both comprise one or more tags.

10. The method according to claim 9, wherein said one or more tags represent the credibility of an encrypted sender address, wherein the unencrypted sender address is unknown.

11. The method according to claim 9, wherein said one or more tags represent the credibility of a known provider of a whitelist.

12. The method according to claim 9, wherein received messages are classified based on tags of encrypted sender addresses or whitelists or both.

13. A system for enabling two or more parties to share contact information by sharing a whitelist without revealing the content of said whitelist and for permitting a user sharing said whitelist to identify a received message as coming from a trusted sender, the system comprising:
   (i) a whitelist repository maintaining one or more whitelist shared by two or more parties, each said whitelist comprising encrypted addresses of trusted users that are approved for sending messages, the encrypted addresses being created using a one-way encryption method producing an encrypted sender's address, wherein the one-way encryption method can produce an encrypted address from a non-encrypted address but the non-encrypted address cannot be determined based on the encrypted address;
   (ii) a message handler that (a) receives a message to be approved, (b) extracts from the message its sender's address, (c) encrypts said sender's address according to the same one-way encryption method used to create the encrypted addresses in the whitelist, thereby producing an encrypted sender's address, and (d) sends the encrypted sender's address to a verification server;

(iii) a verification server that verifies if said encrypted sender's address is present in said whitelist repository containing addresses of trusted sender addresses encrypted by said one-way encryption method, and approves a received message as coming from a trusted sender only if said encrypted sender's address is present in said whitelist repository.

14. The method according to claim 13, wherein said received message is an e-mail message, instant message, fax message, Short Message Service (SMS) message, telephone call, Voice over IP (VoIP) call or any combination thereof.

15. The system according to claim 13, wherein said whitelist repository contains a plurality of said whitelists.

16. The system according to claim 15, wherein at least one of said encrypted addresses or at least one of said whitelists or both comprise one or more tags.

17. The method according to claim 16, wherein said one or more tags represent the credibility of an encrypted sender address, wherein the unencrypted sender address is unknown.

18. The method according to claim 16, wherein said one or more tags represent the credibility of a known provider of a whitelist.

19. The method according to claim 16, wherein received messages are classified based on tags of encrypted sender addresses or whitelists or both.

20. A computer-usable memory having computer readable instructions stored thereon for execution by a processor to perform a method for enabling two or more parties to share contact information by sharing a whitelist without revealing the content of said whitelist and for permitting a user sharing such a whitelist to identify a received message as coming from a trusted sender in a whitelist repository, the method comprising the steps of:

(i) creating a whitelist repository shared by two or more parties, the whitelist repository comprising one or more whitelists of encrypted addresses of trusted users that are approved for sending messages, the encrypted addresses being created using a one-way encryption method producing an encrypted sender's address, wherein the one-way encryption method can produce an encrypted address from a non-encrypted address but the non-encrypted address cannot be determined based on the encrypted address;

(ii) when a message to be approved is received by a party sharing said whitelist repository of encrypted addresses of trusted users, extracting from the message its sender's address;

(iii) encrypting said sender's address according to the same one-way encryption method used in step (i), thereby producing an encrypted sender's address; and (iv) verifying if said encrypted sender's address is present in the whitelist repository containing encrypted addresses of trusted sender addresses encrypted by said one-way encryption method and identifying a received message as coming from a trusted sender only if said encrypted sender's address is present in said whitelist repository of encrypted addresses of trusted users.

* * * * *